United States Patent
Lin

(10) Patent No.: US 7,070,198 B2
(45) Date of Patent: Jul. 4, 2006

(54) FOLDING SUPPORT MEMBER OF HANDLEBARS OF A CART FOR A PERSON TO RIDE ON

(75) Inventor: Samuel Lin, Chia Yi (TW)

(73) Assignee: Sunpex Technology Co., Ltd., Chia Yi (TW)

( * ) Notice: Subject to any disclaimer, the term of this patent is extended or adjusted under 35 U.S.C. 154(b) by 55 days.

(21) Appl. No.: 10/989,347

(22) Filed: Nov. 17, 2004

(65) Prior Publication Data

US 2006/0102405 A1   May 18, 2006

(51) Int. Cl.
*B62B 1/04* (2006.01)

(52) U.S. Cl. .................. 280/655.1; 74/551.1; 74/551.3; 180/208; 280/304.1; 403/100; 403/102

(58) Field of Classification Search ............ 280/87.05, 280/304.1, 655, 655.1; 180/65.1, 208, 907; 74/551.1–551.8; 403/100, 102
See application file for complete search history.

(56) References Cited

U.S. PATENT DOCUMENTS

| | | | |
|---|---|---|---|
| 5,388,659 A * | 2/1995 | Pepe ........................... | 180/219 |
| 6,176,337 B1 * | 1/2001 | McConnell et al. ........ | 180/208 |
| 6,347,681 B1 * | 2/2002 | Patmont et al. ............. | 180/220 |
| 6,581,492 B1 * | 6/2003 | Chen ........................ | 74/551.3 |
| 6,695,081 B1 * | 2/2004 | Chu et al. .................. | 180/65.1 |

* cited by examiner

*Primary Examiner*—Lesley D. Morris
*Assistant Examiner*—Marc A. Scharich
(74) *Attorney, Agent, or Firm*—Rosenberg, Klein & Lee

(57) ABSTRACT

A cart has a folding support for handlebars, which includes a lower rod secured on a front part of a frame, a pivotal rod pivoted to an upper end of the lower rod, and an upper tube positioned in a linearly displaceable manner around the pivotal rod from a lower end; the pivotal rod has a lengthways extending slot; the upper tube has two opposing holes; handlebars of the cart are connected to an upper end of the upper tube; a connecting element is passed through the opposing holes and the slot such that the upper tube will prevent the pivotal rod from moving relative to the lower rod when it is around the pivotal rod and the lower rod, and such that the support can be folded with the pivotal rod pivoting on the lower rod when the upper tube is apart from the lower rod.

1 Claim, 4 Drawing Sheets

FOLDING SUPPORT MEMBER OF HANDLEBARS OF A CART FOR A PERSON TO RIDE ON

BACKGROUND OF THE INVENTION

1. Field of the Invention

The present invention relates to a folding support member of handlebars of a cart for a person to ride on, more particularly one, which is relatively easy to use, capable of being secured in the stretched position and made foldable respectively by means of lowering and lifting the handlebars connected thereto.

2. Brief Description of the Prior Art

Carts for a person to ride on are available to the elder and those who suffer a stroke or physically disabled because of accidents or illness such that they can move around without help from other people.

However, conventional carts are not equipped with foldable support for the handlebars thereof therefore they can't be reduced in size. Consequently, they will occupy much space in storage and transportation, causing inconvenience.

SUMMARY OF THE INVENTION

It is a main object of the present invention to provide a foldable support to the handlebars of a cart to overcome the above disadvantage.

The foldable support of the present invention includes a lower rod secured on a front part of a frame, a pivotal rod pivoted to an upper end of the lower rod, and an upper tube positioned in a linearly displaceable manner around the pivotal rod from a lower end. The pivotal rod has a lengthways-extending slot while the upper tube has two opposing holes. Handlebars of the cart are connected to an upper end of the upper tube. And, a connecting element is passed through the opposing holes of the upper tube and the slot. Thus, the upper tube will prevent the pivotal rod from moving relative to the lower rod when it is around both the pivotal rod and the lower rod, and such that the support can be folded with the pivotal rod pivoting on the lower rod after the upper tube is lifted.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
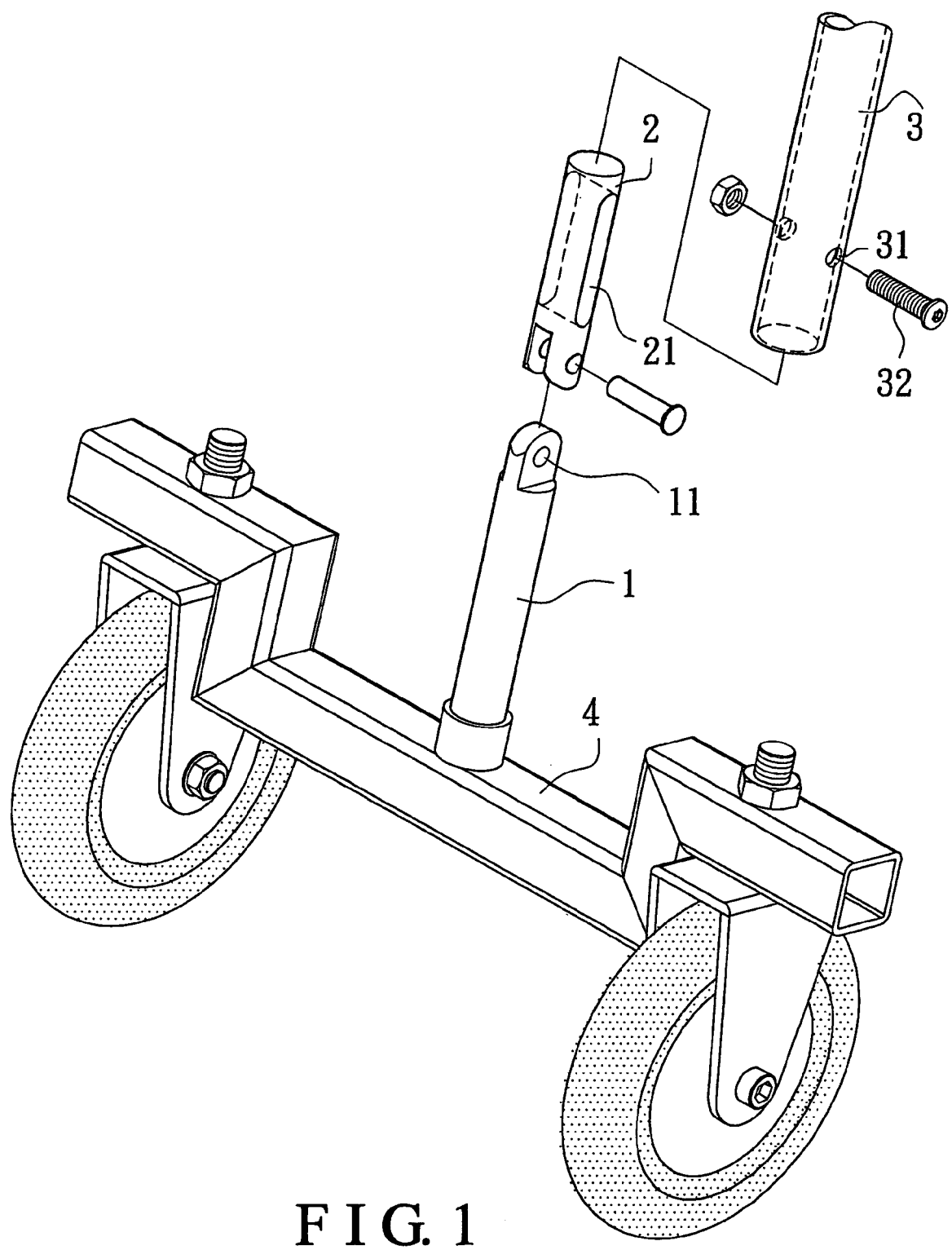
FIG. 1 is an exploded perspective view of the folding support member of handlebars of a cart according to the present invention.
Figure 2:
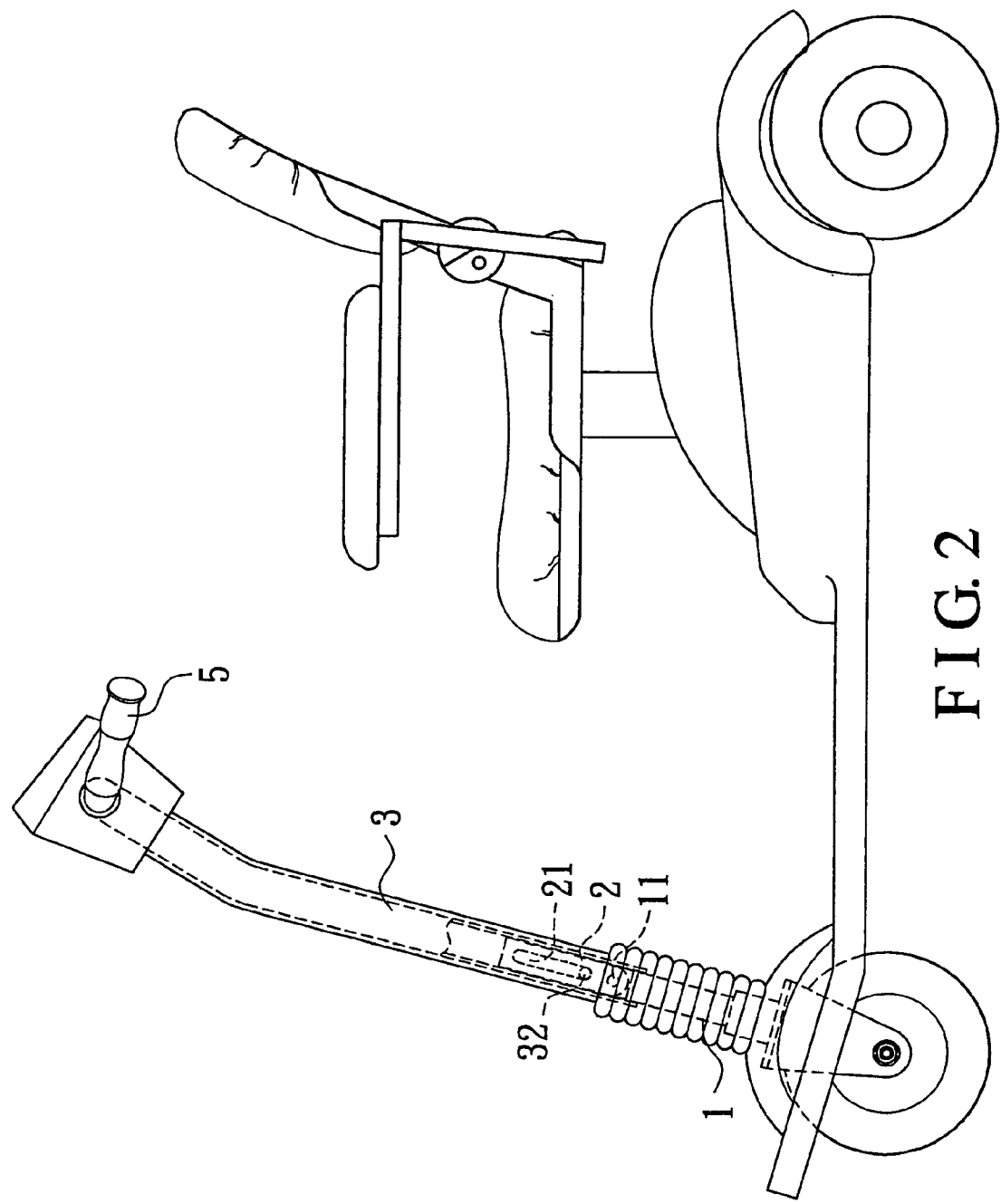
FIG. 2 is a side view of a cart with the present support member of handlebars in the stretched position.

Referring to FIGS. 1 and 2, a preferred embodiment of a folding support member of handlebars of a cart includes a lower rod part 1, a pivotal rod 2, and an upper tube part 3.

The lower rod part 1 is secured on a front part 4 of a frame of the cart at a lower end, which frame front part 4 has two front wheels connected thereto. The lower rod part 1 has a pivotal portion 11 at an upper end.

The pivotal rod 2 has a pivotal portion 22 at a lower end, and a slot 21 extending lengthways above the pivotal portion 22. The pivotal rod 2 is pivoted to the pivotal portion 11 of the lower rod part 1 at the pivotal portion 22 thereof.

The upper tube part 3 has two radial through holes 31, which face each other, and it is connected to handlebars 5 of the cart at an upper end. Furthermore, the upper tube part 3 is positioned around the pivotal rod 2 from a lower end in a linearly displaceable manner while a connecting element 32 is passed through the opposing through holes 31 and the slot 21 of the pivotal rod 2, and secured to the upper tube part 3.

Figure 3:
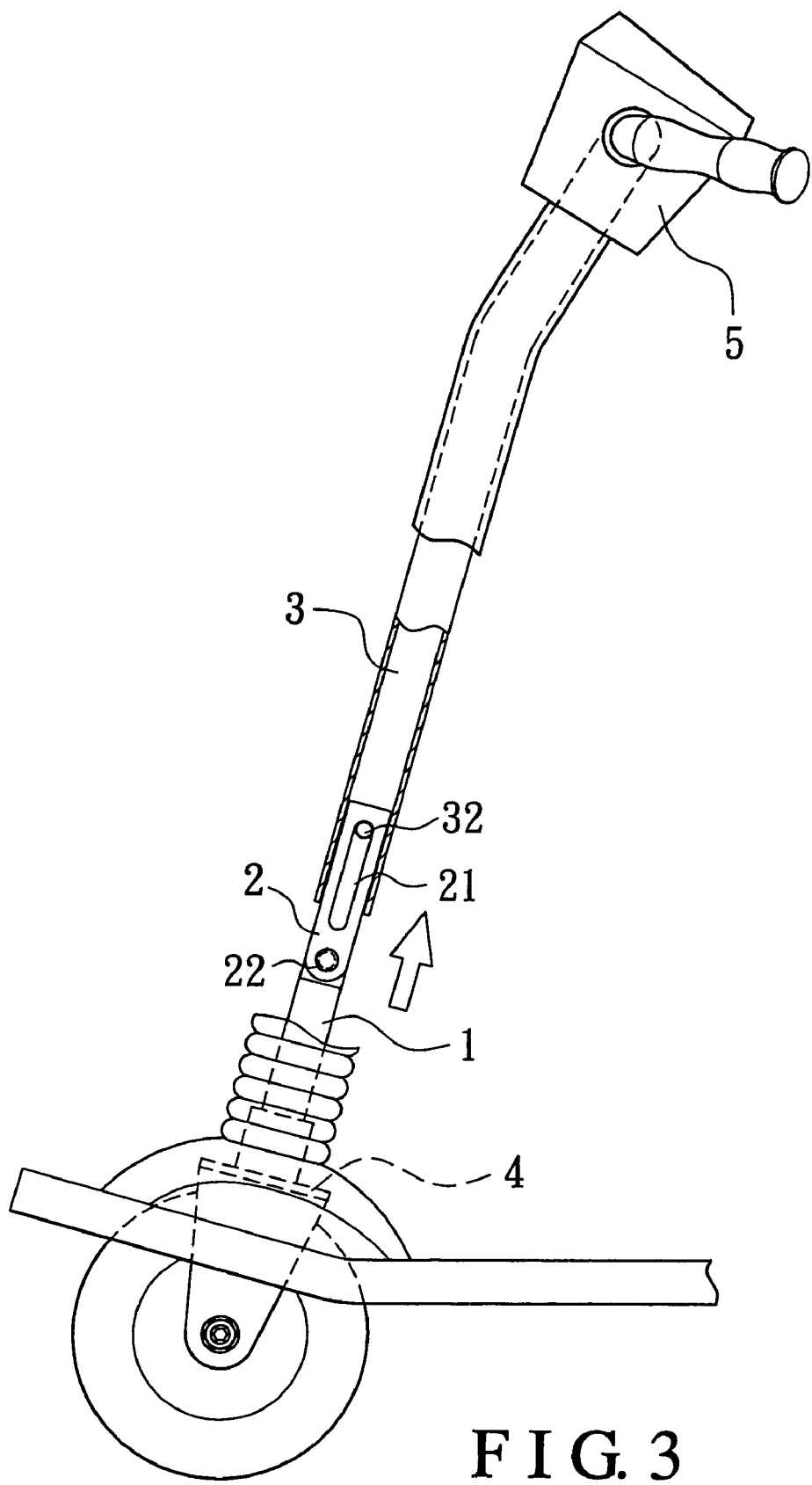
FIG. 3 is a side view of the present support member of handlebars in the foldable position.
Figure 4:
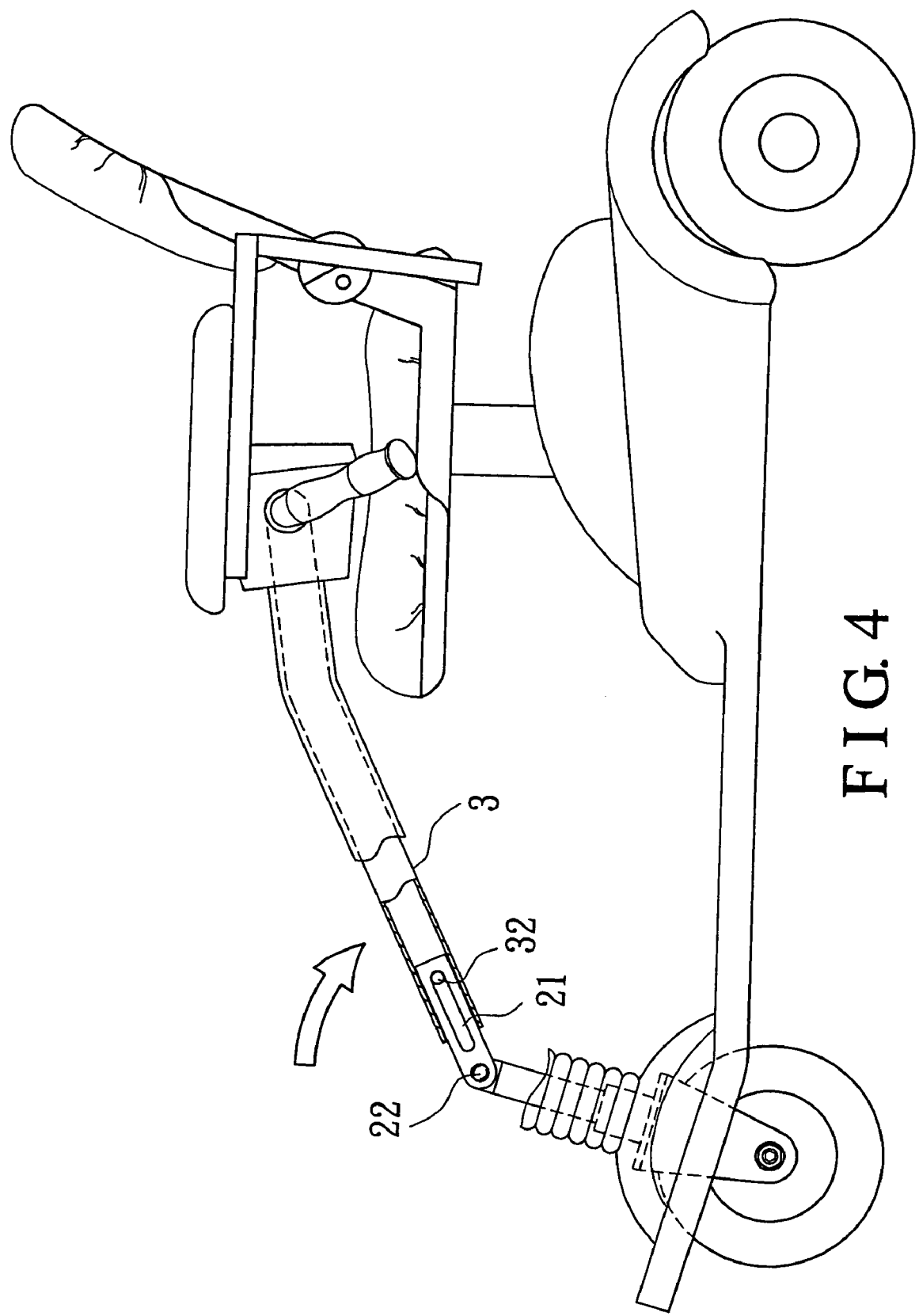
FIG. 4 is a side view of a cart with the present support member of handlebars in the folded position.

Thus, referring to FIG. 2, when the connecting element 32 is near to a lower end of the slot 21, the upper tube part 3 will be around the pivotal portions 11 and 21 of the lower rod part 1 and the pivotal rod 2, preventing the pivotal rod 2 from moving relative to the lower rod part 1. And, referring to FIG. 3, when the connecting element 32 is near to an upper end of the slot 21, the upper tube part 3 will be apart from the pivotal portions 11 and 21, allowing the pivotal rod 2 to pivot on the lower rod part 1. Therefore, the support member of the present invention can be folded with the upper tube part 3 and the pivotal rod 2 together being rearwards angularly displaced, as shown in FIG. 4.

From the above description, it can be easily understood that the present folding support member of handlebars of a cart has advantages as followings:

1. It can be folded to occupy less space therefore the cost of storage and transportation of the cart will reduce.
2. The present support member will be foldable as soon as the upper tube part is lifted to the highest position. And, the present support member will be secured in the stretched position as soon as the upper tube part is moved to the lowest position. Therefore, the support member is easy to use.

What is claimed is:

1. A folding support member of handlebars of a cart for a person to ride on, comprising
   a lower rod part secured on a front part of a frame of a cart at a lower end, which front part has two front wheels connected thereto;
   a pivotal rod pivoted to an upper end of the lower rod part at a lower end thereof; the pivotal rod having a slot extending lengthways above the pivotal lower end thereof; and
   an upper tube part positioned in a linearly displaceable manner around the pivotal rod from a lower end thereof; the upper tube part having two radial through holes facing each other; handlebars of the cart being connected to an upper end of the upper tube part; the upper tube part having a connecting element secured thereto, which is passed through the opposing radial through holes and the slot of the pivotal rod;
   whereby when the connecting element is in a lower end of the slot, the upper tube part will be around both the pivotal rod and the lower rod part, thus preventing the pivotal rod from moving relative to the lower rod part; and
   whereby when the connecting element is in an upper end of the slot, the upper tube part will be apart from the lower rod part, thus allowing the pivotal rod to be rearwards angularly displaced relative to the lower rod part.

* * * * *